Patented Feb. 8, 1938

2,107,796

UNITED STATES PATENT OFFICE 2,107,796

DEODORIZING POLYMERIZED HALOPRENE

Alexander D. Macdonald, Malden, Mass., assignor to B. B. Chemical Co., a corporation of Massachusetts No Drawing. Application December 3, 1934, Serial No. 755,850

7 Claims. (Cl. 260—2)

This invention relates to polymerized haloprenes and more particularly to the removal of the characteristic and pungent odor from commercial polymerized chloroprene.

Polymerized chloroprene, a synthetic plastic rubber-like material marketed under the commercial name of "DuPrene", has a number of commercial applications, including its use in adhesive compositions. Commercial polymerized chloroprene has a penetrating and pungent odor which is, at least to some degree, offensive. For many commercial applications the odor of the DuPrene is perhaps immaterial, whereas for other purposes, including certain adhesive uses, the characteristic DuPrene odor is highly undesirable, both to the operator employing the material in course of manufacture and to the user of the finished article.

The chemical nature of the malodorant constituents of commercial polymerized chloroprene is not known to me but tests which I have made indicate that it includes a portion volatilizable at or below 200° F. and a portion volatilizable at higher temperatures. The odor, which is pungent, rather disagreeable, and lasting, suggests to some extent the odor of "tear gas."

An object of this invention is to remove the malodorant constituents of commercial polymerized chloroprene to such an extent that the undesirable odor will be inappreciable or entirely absent to operators employing the polymerized chloroprene in manufacturing operations. Another object is to remove such malodorants to such an extent that a finished article, such as one the component parts of which have been adhesively secured together by polymerized chloroprene, will not have any residual odor obnoxious or apparent to the purchaser or user of such article. A further object is to provide a method of removing such odor without impairing the properties of polymerized chloroprene for adhesive or other purposes.

Other objects will be apparent to those skilled in the art to which this invention appertains from the accompanying disclosure and claims.

In the accomplishment of the above and other objects the malodorant constituents of polymerized chloroprene, for example, DuPrene, may be removed by mechanically working said polymerized chloroprene so as to expose fresh surfaces thereof and concomitantly subjecting said polymerized chloroprene and said fresh surfaces thereof to the action of a selective solvent for the molodorant constituents of said polymerized chloroprene until the desired deodorization of the polymerized chloroprene has been accomplished. The concomitant extraction and mechanical working is preferably continued until substantially the entire mass of the polymerized chloroprene has been subjected to the action of the solvent. A preferred form of mechanical working is carried out by milling the polymerized chloroprene on a mill of the type commonly used in the rubber industry.

I have discovered that certain materials are selective solvents for the malodorant constituents of polymerized chloroprene and therefore the invention contemplates the milling or other mechanical working of the polymerized chloroprene in the presence of one or more solvents of the arbitrary class consisting of aliphatic monohydric alcohols, saturated or unsaturated aliphatic hydrocarbons, ethers, naptha, saturated cyclic hydrocarbons and their derivatives, and related and equivalent compounds. A preferred group of solvents comprises the aliphatic monohydric alcohols, such as methyl, ethyl, propyl, and butyl alcohols, and, generally speaking, of this group I prefer the use of ethyl alcohol, partly because of its efficient extractive action, non-toxic properties, low cost, and availability. It will be understood, of course, that the invention in its broader aspects contemplates the use of any selective solvent for the malodorant constituents of polymerized chloroprene.

In an illustrative mode of practicing my invention, polymerized chloroprene, for example DuPrene, is placed on the rolls of a mill of a type commonly used in rubber manufacture. The DuPrene is then milled in the presence of ethyl alcohol, which is a solvent for the malodorant constituents of polymerized chloroprene but a non-solvent for polymerized chloroprene itself. This milling in the presence of ethyl alcohol may be accomplished in various ways. Thus, the DuPrene, after passing through the rolls of the mill, may be caused to pass directly into a bath of ethyl alcohol and then passed from said bath back through the rolls, and this procedure may be carried on as a continuous process. Alternatively, a stream of ethyl alcohol may be directed on the DuPrene as it passes through the rolls of the mill and this alcohol may then be recirculated. Obviously, the two methods just outlined may be combined by directing the stream of ethyl alcohol onto the DuPrene as it passes through the rolls and then passing the DuPrene itself from the rolls into a bath of alcohol prior to repassing the DuPrene through the rolls. Furthermore, the rolls themselves may be submerged in a bath of ethyl alcohol and the DuPrene passed and repassed through the rolls of the mill. This concomitant mechanical working of the DuPrene and extraction by alcohol is preferably continued until substantially the entire mass of the DuPrene has been subjected to the action of the alcohol.

The efficacy of the above-described deodorizing process appears to be due in large part to the fact that the milling operation continually exposes fresh surfaces of the DuPrene as a result of which the malodorant constituents are continually being brought to the surface and exposed to the extractive and solvent action of the alcohol.

Preferably, following the concomitant milling and extraction operations, the polymerized chloroprene is washed with fresh alcohol in order to prevent any residuum of the extracted malodorant material from being redeposited upon the surface of the polymerized chloroprene after the evaporation of the solvent alcohol.

While I have described hereinabove more particularly the exposure of fresh surfaces of polymerized chloroprene by a milling operation, it will be understood that the invention contemplates the employment of other and equivalent forms of mechanical working to accomplish the objects of the invention.

Polymerized chloroprene in its commercial and undeodorized form usually contains from 1 to 2% of a stabilizing material, such as phenyl-beta-naphthylamine or phenyl-alpha-naphthylamine, in order to prevent premature curing of the plastic polymerized chloroprene. Since phenyl-beta-naphthylamine and other similar substances are soluble in ethyl alcohol such stabilizing material would be in a large measure removed by the above-described deodorizing method. It is in many cases desirable, therefore, after the deodorizing operation, to incorporate into the deodorized plastic polymerized chloroprene from 1 to 2% of a stabilizer, such as phenyl-beta-naphthylamine.

When the method of this invention is carried out by means of naphtha or certain of the other selective solvents mentioned hereinabove, the polymerized chloroprene is swelled to some degree thereby. In cases where the polymerized chloroprene in swelled form, or the presence of the solvent, is not desirable, excess solvent may be removed and the polymerized chloroprene reduced in dimension in any suitable manner, such as by pressing or centrifuging the swelled polymer.

The polymerized chloroprene deodorized in accordance with this invention may be employed in the arts in the same manner as undeodorized polymerized chloroprene. Thus, the polymerized chloroprene deodorized according to this invention may subsequently be compounded and subjected to various manufacturing steps in the same manner as if the polymerized chloroprene had not been deodorized. Furthermore, the polymerized chloroprene may be employed in the preparation of adhesive compositions in like manner as if no deodorizing treatment had been carried out. However, adhesives prepared from polymerized chloroprene deodorized in accordance with this invention are free from the highly undesirable odor hitherto associated with such adhesives while, on the other hand, the mechanical properties of the adhesive are in no way impaired by reason of the deodorization.

It will be apparent that as a result of this invention many new uses for polymerized chloroprene are made possible, particularly in cases where the undesirable odor associated with undeodorized polymerized chloroprene would be a bar.

Having described my invention, what I claim as new and desire to secure by Letters Patent of the United States is:

1. The method of deodorizing plastic polymerized chloroprene which comprises milling said polymerized chloroprene in the presence of an aliphatic monohydric alcohol for a time sufficient to remove the malodorant constituents of said polymerized chloroprene.

2. The method of deodorizing plastic polymerized chloroprene which comprises milling said polymerized chloroprene so as to expose fresh surfaces thereof, concomitantly subjecting said polymerized chloroprene to the action of ethyl alcohol, and continuing said milling and said subjecting to ethyl alcohol until the desired deodorization of the polymerized chloroprene has been accomplished.

3. The method of deodorizing plastic polymerized chloroprene which comprises milling said polymerized chloroprene in ethyl alcohol.

4. The method of deodorizing plastic polymerized chloroprene which comprises milling said polymer so as to expose fresh surfaces thereof, passing said milled polymer into an aliphatic monohydric alcohol, and repeating said steps until substantially the entire mass of the polymer has been subjected to the action of the aliphatic monatomic alcohol and the desired deodorization of the polymerized chloroprene has been accomplished.

5. The method of deodorizing plastic polymerized chloroprene which comprises milling said polymerized chloroprene and thereby exposing fresh surfaces thereof and concomitantly subjecting said fresh surfaces of the polymer to a selective solvent for the malodorant constituents of said polymerized chloroprene, and continuing said milling and exposure to solvent until substantially the entire mass of the polymer has been subjected to the action of the solvent and the desired deodorization of the polymer has been accomplished.

6. The deodorized product obtained by milling plastic polymerized chloroprene and thereby exposing fresh surfaces thereof and concomitantly subjecting said fresh surfaces of the polymer to a selective solvent for the malodorant constituents of said polymerized chloroprene, and continuing said milling and exposure to solvent until substantially the entire mass of the polymer has been subjected to the action of the solvent.

7. The deodorized product obtained by milling plastic polymerized chloroprene in the presence of ethyl alcohol for a time sufficient to expose substantially the entire mass of the polymer to the solvent.

ALEXANDER D. MACDONALD.